United States Patent [19]

Heitmann et al.

[11] Patent Number: 4,969,551
[45] Date of Patent: Nov. 13, 1990

[54] METHOD OF AND APPARATUS FOR ROLLING ROD-SHAPED ARTICLES

[75] Inventors: Uwe Heitmann, Hamburg; Peter Pinck, Gross-Hansdorf; Berthold Maiwald, Schwarzenbek; Rolf Lindemann, Glinde; Peter Brand, Hamburg, all of Fed. Rep. of Germany

[73] Assignee: Körber AG, Hamburg, Fed. Rep. of Germany

[21] Appl. No.: 356,376

[22] Filed: May 23, 1989

[30] Foreign Application Priority Data

May 30, 1988 [DE] Fed. Rep. of Germany ....... 3818309

[51] Int. Cl.$^5$ ............................................. B65G 29/00
[52] U.S. Cl. ..................................... 198/384; 198/416
[58] Field of Search ............ 198/384, 416, 380, 346.2, 198/339.1

[56] References Cited

U.S. PATENT DOCUMENTS

| | | | |
|---|---|---|---|
| 2,788,113 | 4/1957 | Waal | 198/416 X |
| 2,793,734 | 5/1957 | Lorenzen | 198/380 |
| 3,110,247 | 11/1963 | Simpson | 198/416 X |
| 3,200,968 | 8/1965 | Gaddini | 198/384 X |
| 3,583,546 | 6/1971 | Koop . | |
| 3,618,743 | 11/1971 | Benatar | 198/384 |
| 3,889,591 | 6/1975 | Noguchi | 198/380 X |
| 4,011,950 | 3/1977 | McLoughlin et al. . | |
| 4,230,219 | 10/1980 | Pezzin et al. | 198/346.2 |
| 4,240,448 | 12/1980 | Heitmann et al. . | |
| 4,283,998 | 8/1981 | Greve et al. . | |
| 4,327,825 | 5/1982 | Ackley, Sr. et al. | 198/384 X |
| 4,335,810 | 6/1982 | Ackley et al. | 198/380 |
| 4,364,462 | 12/1982 | Tolasch et al. . | |
| 4,498,574 | 2/1985 | Fischer | 198/380 |
| 4,550,821 | 11/1985 | Horie et al. | 198/416 |
| 4,854,441 | 8/1989 | McBrady et al. | 198/384 |

Primary Examiner—Joseph E. Valenza
Assistant Examiner—D. Glenn Dayoan
Attorney, Agent, or Firm—Peter K. Kontler

[57] ABSTRACT

The diameters of successive rod-shaped articles of the tobacco processing industry are ascertained while the articles advance in the flutes of a conveyor, first along a rolling unit which turns successive articles at random through different angles and thereupon past a photoelectronic detector wherein a radiation source emits a narrow beam of radiation which impinges upon successive articles for intervals of time which are dependent upon the diameters of the articles. The transducer of the detector generates signals which are indicative of the monitored diameters, and such signals are transmitted to an evaluating circuit which controls an ejector for unsatisfactory articles and/or displays the monitored diameters on a screen. The articles are partially lifted off the conveyor by cushions of compressed air during transport past the rolling unit.

8 Claims, 4 Drawing Sheets

METHOD OF AND APPARATUS FOR ROLLING ROD-SHAPED ARTICLES

BACKGROUND OF THE INVENTION

The invention relates to methods of and to apparatus for ascertaining the diameters of rod-shaped articles, particularly for ascertaining the diameters of filter rod sections, plain or filter cigarettes, cigars, cigarillos, cheroots and/or other rod-shaped articles of the tobacco processing industry.

The diameters of rod-shaped articles of the tobacco processing industry (hereinafter referred to as cigarettes with the understanding, however, that the procedure is or can be the same if the articles are cigars, cigarillos, cheroots or filter rod sections) are monitored for the purpose of segregating deformed cigarettes from satisfactory cigarettes. For example, greatly deformed cigarettes which have an oval or other non-circular cross-sectional outline should be segregated from satisfactory (round) cigarettes in order to avoid problems during gathering of cigarettes into arrays which are ready to be draped into blanks of paper, metallic foil and/or other wrapping material in a packing machine. Moreover, cigarettes which are not round will be turned out by a machine which is likely to require adjustment, i.e., detection of cigarettes which are not exactly round is tantamount to detection of a defect in the cigarette making or processing machine.

In accordance with a presently preferred technique, the diameters of cigarettes are monitored by photoelectronic means including a radiation source which is placed adjacent the path of transport of a series of cigarettes in a cigarette maker or in a cigarette processing machine, and a transducer which generates signals in response to impingement of radiation issuing from the source or in response to interruption of such impingement. The cigarettes to be tested normally advance at right angles to their respective axes, and each cigarette interrupts the beam of radiation issuing from the source for an interval of time which is indicative of the diameter of the respective cigarette. In other words, the length of intervals of interruption of impingement of the beam of radiation upon the transducer of the photoelectronic detector is indicative of the monitored diameter of the respective cigarette. Signals which are generated by the transducer are processed in a suitable evaluating circuit so that each processed signal denotes the diameter of the respective cigarette. A comparison of detected diameters with a desired value indicates whether or not the diameters of tested articles are satisfactory.

A single measurement, i.e., with a single photoelectronic detector, does not invariably ensure accurate determination of the shape of a rod-shaped article. For example, one side of a cigarette can be flattened while the remainder of the cigarette exhibits an acceptable circular shape. Therefore, many presently known apparatus which are used to ascertain the diameters of cigarettes employ a plurality of photoelectronic detectors with radiation sources distributed in such a way that the beams of radiation are inclined relative to each other. This renders it possible to ascertain several diameters and to generate signals which are thereupon compared with each other or with a signal denoting the desired diameter of a cigarette in order to obtain a more reliable indication concerning the actual cross-sectional outline of each of a series of successively tested cigarettes. Reference may be had, for example, to U.S. Pat. No. 4,011,950. A drawback of the patented apparatus is that it must rely on a plurality of detectors and that it must employ a rather complex circuitry which evaluates signals from the transducers of several discrete detectors. Moreover, the results of measurements are still unreliable.

OBJECTS OF THE INVENTION

An object of the invention is to provide a novel and improved method of ascertaining the diameters of rod-shaped articles which must be tested at a high or extremely high frequency, for example, at the rate at which cigarettes or filter rod sections issue from a modern high-speed cigarette or filter rod making machine.

Another object of the invention is to provide a method which can furnish reliable indications concerning the diameters of tested articles even though it can be practiced with a single detector.

A further object of the invention is to provide a method which ensures reliable determination of diameters of cigarettes, filter rod sections and/or other rod-shaped articles of the tobacco processing industry in a simple, inexpensive and time-saving manner.

An additional object of the invention is to provide a novel and improved method of rotating rod-shaped articles, for example, plain or filter cigarettes or filter rod sections, about their respective axes, particularly for the purpose of ascertaining the diameters of such articles.

Still another object of the invention is to provide a novel and improved method of testing rod-shaped articles of the tobacco processing industry prior to admission into a packing or other processing machine.

A further object of the invention is to provide a novel and improved method of testing rod-shaped articles of the tobacco processing industry preparatory to admission of articles into a reservoir, for example, for the purpose of permitting setting of adhesive and/or plasticizer in filter rod sections.

Another object of the invention is to provide a novel and improved apparatus for ascertaining the diameters of rod-shaped articles, particularly rod-shaped articles of the tobacco processing industry, in a simple, inexpensive and time-saving manner.

A further object of the invention is to provide an apparatus which can employ a number of standard components of the type presently used in production lines for the making of packets of cigarettes or other tobacco-containing products.

An additional object of the invention is to provide a novel and improved apparatus for rotating rod-shaped articles, particularly rod-shaped articles of the tobacco processing industry, about their respective axes.

Another object of the invention is to provide the apparatus with novel and improved means for transmitting torque to rod-shaped articles which are transported in the flutes of an endless conveyor.

A further object of the invention is to provide the apparatus with novel and improved means for moving rod-shaped articles with reference to their conveyor during transport of articles through a testing station, especially a station where the articles are tested for the purpose of ascertaining their cross-sectional outlines.

An additional object of the invention is to provide an apparatus for ascertaining the diameters of rod-shaped articles which can be readily installed in existing production lines for the making of packets containing plain or filter cigarettes or other rod-shaped smokers' products.

SUMMARY OF THE INVENTION

One feature of the present invention resides in the provision of a method of ascertaining the diameters of rod-shaped articles of the tobacco processing industry. The method comprises the steps of conveying a series of articles in a predetermined direction along a predetermined path substantially at right angles to the axes of the articles, directing at least one beam of radiation (e.g., visible light) across a first portion of the path so that the beam impinges upon successive articles of the series for intervals of time which are dependent upon the diameters of the respective articles, generating signals having characteristics (e.g., intensity) indicative of the intervals, and rotating the articles about their respective axes in a second portion of the path upstream of the first portion. The rotating step preferably includes turning the articles at random through different angles, i.e., there is no need for a certain regularity or predictability in the extent to which successive articles are rotated about their respective axes.

The conveying step includes maintaining the articles in contact with a moving support (e.g., with a rotary drum-shaped conveyor having axially parallel peripheral flutes for the articles), and the method can further comprise the step of reducing the extent of contact between the articles and the support in the course of the rotating step. The just mentioned step of reducing the extent of contact can include at least partially lifting the articles off the support. If the support has flutes into which the articles extend, the lifting step can include causing the articles to practically float in their respective flutes, as long as they continue to advance in the predetermined direction. It is preferred to pneumatically lift the articles off their support.

The conveying step includes advancing the articles at a first speed, and the rotating step can include contacting the advancing articles with a rolling surface and moving the rolling surface in the predetermined direction at a second speed which is different from the first speed. For example, the second speed can equal zero.

The rotating step can include applying to the articles torque of varying magnitude. This greatly increases the likelihood that the articles will be turned at random through different angles.

Another feature of the invention resides in the provision of a method of rotating rod-shaped articles (for example, filter rod sections or plain or filter cigarettes) about their respective axes. This method comprises the steps of maintaining the articles in contact with a conveyor and advancing the articles in a predetermined direction along a predetermined path, positioning a rolling surface adjacent a portion of the path, and pneumatically moving the articles relative to the conveyor into contact with the rolling surface while continuing to move the articles in the predetermined direction. The moving step can include reducing the extent of contact between the articles and the conveyor. The maintaining step can include introducing the articles into the flutes of a fluted conveyor so that the articles contact the surfaces surrounding the respective flutes, and the moving step can include admitting a compressed gas into the flutes in a direction to expel the articles from the respective flutes. The positioning step of such method includes placing the rolling surface sufficiently close to the conveyor to prevent complete expulsion of articles from their flutes, i.e., portions of the articles continue to extend into the flutes to thus ensure that the articles continue to advance in the predetermined direction. This method can also include the step of maintaining the articles in contact with the rolling surface with a varying force in order to vary the magnitude of torque which the rolling surface transmits to articles which move along the predetermined portion of the path.

A further feature of the invention resides in the provision of an apparatus for ascertaining the diameters of rod-shaped articles of the tobacco processing industry. The improved apparatus comprises means (such as the aforementioned drum-shaped fluted conveyor) for conveying a series of articles in a predetermined direction along a predetermined path substantially at right angles to the axes of the articles, a light source or other suitable means for directing at least one beam of radiation across a first portion of the path so that the beam impinges upon successive articles of the series for intervals of time which are dependent upon the diameters of the articles, means for generating signals having characteristics which are indicative to the intervals, and means for rotating the articles about their respective axes in a second portion of the path upstream of the first portion. In accordance with a presently preferred embodiment of the apparatus, the rotating means has a rolling surface which extends in the predetermined direction along the second portion of the path. The rolling surface is or can be stationary, as long as there is relative movement between the conveying means and the rolling surface in order to ensure that the articles entering the second portion of the path are compelled to rotate about their respective axes.

The rotating means can further comprise one or more projections which extend from the rolling surface toward the conveying means so that they can be engaged by and can impart a rolling movement to oncoming successive articles of the series. Each projection is preferably elongated and is substantially parallel to the articles in the predetermined path.

The rotating means can include means for applying to the articles torque of varying magnitude.

The rotating means can further include means for reducing the extent of contact between the articles and the article contacting surface of the conveying means. The means for reducing the extent of contact can include means for partially lifting the articles off the conveying means. If the article-contacting surface of the conveying means has flutes for the articles of the series, the lifting means can include ports which are provided in the conveying means, a source of pressurized fluid (e.g., an air compressor), and means for connecting the source with those ports which advance along the second portion of the path.

The rotating means preferably includes means for rotating the articles at random through different angles.

An additional feature of the invention resides in the provision of an apparatus for rotating rod-shaped articles about their respective axes, for example, for rotating filter rod sections or plain or filter cigarettes. The apparatus comprises a conveyor having article-receiving flutes and serving to advance the articles in a predetermined direction along a predetermined path, a rolling device which is adjacent a portion of the path, and means for pneumatically moving the articles in their respective flutes into contact with the rolling device. The moving means can include ports which are provided in the conveyor and communicate with the flutes, a source of pressurized fluid, and means for connecting the source with the ports in the aforementioned portion of the path.

The rolling device can include means for applying to the articles torque of varying magnitude.

In accordance with a presently preferred embodiment, the rolling device has a rolling surface which extends in the predetermined direction along the aforementioned portion of the path, and the deepmost portion of each flute in the aforementioned portion of the path is spaced apart from the rolling surface a distance which is greater than the desired diameter of an article.

The novel features which are considered as characteristic of the invention are set forth in particular in the appended claims. The improved apparatus themselves, however, both as to their construction and their modes of operation, together with additional features and advantages thereof, will be best understood upon perusal of the following description of certain presently preferred specific embodiments with reference to the accompanying drawing.

DESCRIPTION OF PREFERRED EMBODIMENTS

Figure 1:
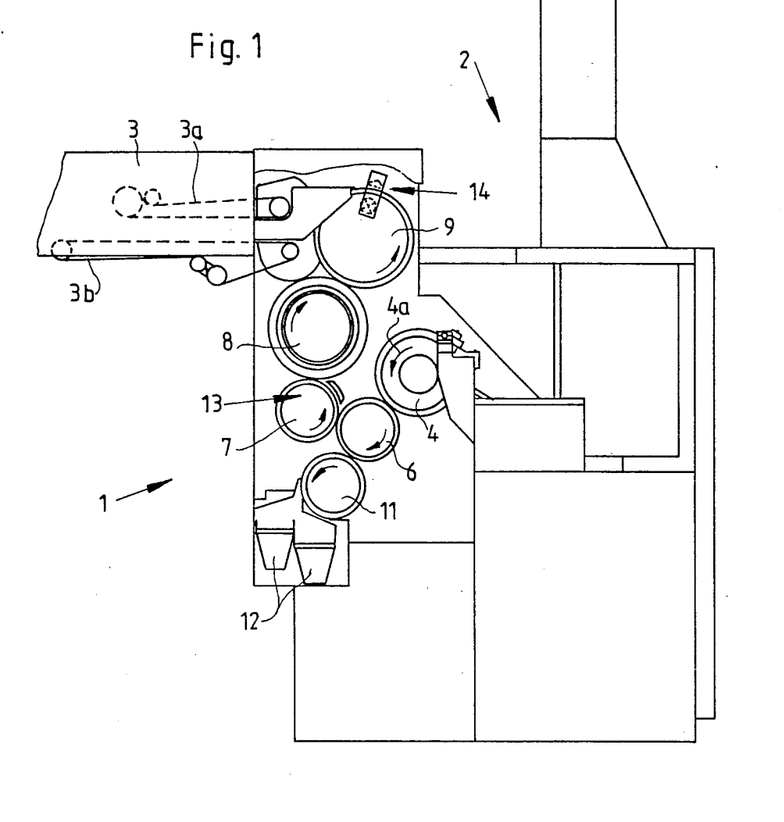
FIG. 1 is a front elevational view of a machine which serves to transfer filter rod sections from a filter rod maker into a reservoir and is provided with an apparatus embodying one form of the invention.

FIG. 1 shows a machine 1 which serves to transfer filter rod sections of unit length or multiple unit length from a filter rod making machine 2 into a magazine or reservoir 3. The filter rod making machine 2 can be of the type known as KDF which is produced and distributed by the assignee of the present application, and the reservoir 3 can be of the type known as RESY (also produced and distributed by the assignee of the present application). Reference may be had, for example, to commonly owned U.S. Pat. No. 4,283,998 to Greve et al. which describes and shows a filter rod making machine, and to commonly owned U.S. Pat. No. 4,364,462 to Tolasch et al. which describes and shows a reservoir for filter rod sections.

The filter rod making machine 2 turns out a continuous filter rod (not shown) which is subdivided into sections of unit length or multiple unit length, and such sections are propelled into successive axially parallel peripheral flutes of a rotary drum-shaped conveyor 4 which is driven to rotate in the direction of arrow 4a. The conveyor 4 advances filter rod sections at right angles to their respective axes and delivers successive filter rod sections into successive axially parallel peripheral flutes of a rotary drum-shaped intermediate conveyor 6 which is driven to advance in a clockwise direction (as seen in FIG. 1) and to deliver the sections into successive axially parallel peripheral flutes of a rotary drum-shaped transfer conveyor 7 which is driven to rotate in a counterclockwise direction and to deliver the sections into successive axially parallel peripheral flutes of a rotary drum-shaped aligning conveyor 8 which is driven to rotate in a clockwise direction. The conveyor 8 cooperates with one or more rotary wheel- or disc-shaped aligning elements (not shown) which are installed in such a way that their axes of rotation are inclined with reference to the axis of the conveyor 8. The purpose of the conveyor 8 and of the aligning element or elements is to ensure that the filter rod-sections in the flutes of the conveyor 8 form a single file of rod-shaped articles which are in exact register with one another prior to entering successive axially parallel peripheral flutes of a rotary drum-shaped inserting conveyor 9 which is driven to rotate in a counterclockwise direction. The purpose of the conveyor 9 is to introduce filter rod sections into the path between two endless belt conveyors 3a, 3b of the reservoir 3 wherein the plasticizer which was applied (in the machine 2) to the filaments of the filler of the filter rod is permitted to set before the filter rod sections are introduced into a filter tipping machine, e.g., into a machine of the type shown in FIG. 5.

The intermediate conveyor 6 is mounted in the frame of the machine 1 adjacent a further rotary drum-shaped conveyor 11 which can be actuated to remove samples of filter rod sections from the flutes of the conveyor 6 and to admit the samples into at least one of several collecting receptacles 12. The samples can be removed from or with the receptacles 12 for the purpose of testing in a laboratory in a manner and for the purposes not forming part of the present invention.

In accordance with a feature of the invention, the machine 1 is equipped with a rotating or rolling unit 13 which is adjacent the path of movement of filter rod sections in the flutes of the transfer conveyor 7 and serves to rotate the filter rod sections about their respective axes before the thus rotated filter rod sections reach a detector 14 which is adjacent the inserting conveyor 9 and serves to generate signals which are indicative of the diameters of successive filter rod sections prior to admission into the reservoir 3. The detector 14 includes a radiation source 14a (see FIG. 2 or 3) and a photoelectronic transducer 14b constituting a means for generating signals denoting (or being capable of processing to denote) the diameters of successive filter rod sections.

FIG. 1 shows that the detector 14 and the rotating or rolling unit 13 (hereinafter called rolling unit) are adjacent two different conveyors in the machine 1. However, and as shown in FIG. 2, it is equally within the purview of the invention to install the detector and the rolling unit adjacent one and the same conveyor in such a way that the rolling unit is located ahead of the detector (as seen in the direction of advancement of filter rod sections at right angles to their respective axes).

Figure 2:
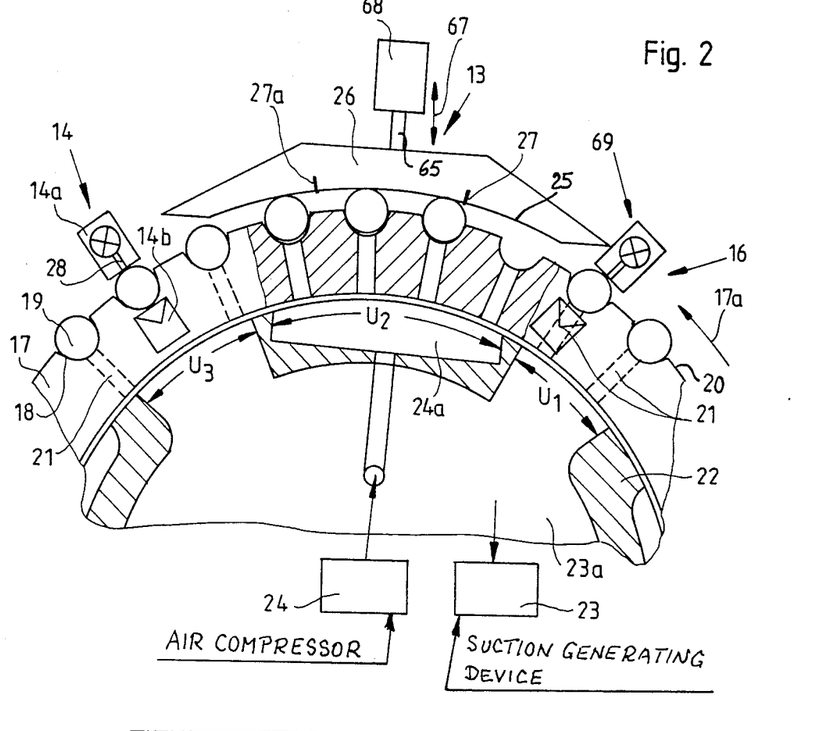
FIG. 2 is an enlarged fragmentary sectional view of an apparatus which can be utilized in the machine of FIG. 1.

FIG. 2 shows an article conveying means 16 which includes a hollow rotary cylindrical drum-shaped conveyor 17 with a cylindrical peripheral surface 20 provided with axially parallel receiving means 18 (hereinafter called flutes for short) for discrete rod-shaped articles 19 (e.g., filter rod sections of unit length or multiple unit length or plain or filter cigarettes of unit or multiple unit length). For example, the conveyor 17 can be used in the machine of FIG. 1 in lieu of the conveyor 7 or 9.

Each flute 18 communicates with one or more radially extending ports 21 in the form of bores or holes which are machined into or otherwise formed in the body of the conveyor 17 and can connect the respective flutes 18 with a suction chamber 23a or with a plenum chamber 24a. The chambers 23a, 24a are defined by the internal surface of the conveyor 17 in conjunction with a stationary valving element 22 which is installed in the conveyor 17. The chamber 23a is connected with a suitable suction generating device 23 (e.g., with the intake of a blower or fan), and the chamber 24a is connected with an air compressor 24 or another suitable source of pressurized gaseous fluid.

The suction chamber 23a has two branches which are adjacent two spaced-apart portions U1 and U3 of the arcuate path for the articles 19 in their respective flutes 18 in the direction of arrow 17a. The plenum chamber 24a is adjacent a further portion U2 of the path for the articles 19, namely a path portion which is located between the portions U1 and U3.

The articles 19 are attracted to the surfaces bounding the respective flutes 18 during travel along the path portions U1, U3 but they are urged out of their respective flutes during advancement along the portion U2 of the path.

The rolling unit 13 of the apparatus which is shown in FIG. 2 comprises a stationary rolling element 26 having a concave rolling surface 25 which extends in the direction of arrow 17a along the path portion U2 (i.e., outwardly adjacent the plenum chamber 24a). The rolling element 26 comprises two elongated strip-shaped projections 27, 27a which extend beyond the rolling surface 25 to be engaged by successive articles 19 on their way into the arcuate clearance between the surfaces 20 and 25. The projections 27 and 27a are parallel to the axes of the articles 19 in the flutes 18.

The photoelectronic detector 14 is located adjacent the path portion U3, namely downstream of the path portion U2, and comprises the aforementioned radiation source 14a (e.g., a source of visible light) and the aforementioned transducer 14b. The radiation source 14a is provided with a narrow channel 28 which causes the radiation to form a narrow beam crossing the path portion U3 radially of the conveyor 17. A narrow or very narrow beam of radiation enhances the accuracy of measurement of diameters of successive articles 19 on their way from the path portion U2 along and beyond the path portion U3.

The purpose of the plenum chamber 24a is to ensure that the extent of contact between the external surfaces of the articles 19 and the concave surfaces bounding the respective flutes 18 is reduced during travel of the articles along the concave rolling surface 25 as well as that the articles are pneumatically forced into actual contact with the rolling element 26 so that they are set in rotary motion not later than when they reach the right-hand projection 27 to thereupon roll along the concave rolling surface portion between the projections 27 and 27a. In other words, each article 19 is rolled about its respective axis before it reaches the testing station proper, namely the gap between the radiation source 14a and the transducer 14b of the photoelectronic detector 14.

The width of the clearance between the surfaces 20 and 25 is less than the standard diameter of an article 19 so that the articles which are partially lifted off the surfaces bounding the corresponding flutes 18 are compelled to continue to advance in the direction of arrow 17a and to thus roll along the concave surface 25 of the rolling element 26. The feature that the extent of contact between the articles 19 and the surfaces bounding the respective flutes 18 is reduced by cushions of gas which develop as a result of admission of pressurized gaseous fluid from the plenum chamber 24a into the flutes 18 by way of the corresponding ports 21 ensures that the articles 19 are invariably caused to roll about their axes during bodily contact of their external surfaces with the concave rolling surface 25.

The articles 19 which advance with the flutes 18 in the direction of arrow 17a toward the rolling device 13 can assume any one of a plurality of different angular positions, i.e., the axially parallel seams of the wrappers of such articles can be disposed in or outside of the respective flutes when the articles reach the projection 27. However, and since the movements of articles which leave the filter rod making machine 1 and advance toward the conveyor 7 of FIG. 1 or toward the conveyor 17 of FIG. 2 are similar or identical, all of the articles which reach the rolling surface 25 normally assume identical or similar angular positions. For example, the axially parallel seams of all or nearly all articles which reach the concave rolling surface 25 can be located at the three o'clock positions. This means that, if the articles 19 have flats or facets which are confined in the respective flutes 18, such flats or facets will not be detected by the detector 14 (in the absence of any undertakings to the contrary) and the tested articles will be admitted into the reservoir 3, and thence into a filter tipping machine, together with articles which are round, i.e., without flats, depressions or other defects. This is the reason that conventional diameter measuring apparatus employ several detectors in such distribution that the beam of radiation issuing from the radiation source of one detector is inclined with reference to the beam of radiation which is emitted by the radiation source of another detector. Such apparatus are less likely to generate signals which do not accurately reflect the cross-sectional outlines of the tested articles.

The apparatus of FIG. 2 reduces the likelihood of inaccurate determination of the cross-sectional outlines of rod-shaped articles 19 by the expedient of rolling the articles about their respective axes. Moreover, and since the articles 19 are lifted off the major parts of surfaces bounding the respective flutes 18 by cushions of a pressurized gaseous fluid (rather than positively by means of pushers, cams or the like), the likelihood that all of the articles advancing along the path portion U2 would be turned through identical angles is practically nil, i.e., the article-rotating step includes turning the articles at random through different angles. This, in turn, ensures that the seams of wrappers of successive articles 19 advancing toward the gap between the radiation source 14a and transducer 14b of the detector 14 are in different angular positions so that the detector 14 is certain to locate those articles which are not exactly round or are flattened or otherwise deformed out of round to an extent which warrants the undertaking of certain corrective measures, particularly an adjustment of one or more components in the machine 1 and/or 2. The manner in which signals which are generated by the transducer 14b can be processed to furnish indications concerning the cross-sectional outlines of the articles 19 will be described with reference to FIG. 4.

It hardly ever happens that a single article 19 is deformed on its way toward the diameter measuring station. As a rule, one or more component parts of the machine 1 and/or 2 are the causes of deformation, and the malfunctioning or improper adjustment of such component or components causes identical or similar deformation of a long series of successive articles 19. Thus, if the evaluating means which receives signals from the detector 14 ascertains the presence of one, two or another relatively small number of articles 19 which are not exactly round, this warrants the conclusion that one or more components of the machine 1 and/or 2 necessitate adjustment because not only the relatively small number of positively identified non-round articles 19 but also the articles preceding and following such non-round articles are likely to be just as defective, i.e., not round but provided with one or more depressions, flats or like configurations which detract from their appearance and/or interfere with predictable manipulation of articles downstream of the detector 14.

Thus, a single detector 14 suffices to reliably detect the presence of defective articles 19 due to the fact that the detector is preceded by the rolling unit 13 which causes successive articles to turn at random through different angles so that the detector is bound to rapidly detect one or more articles of a series of articles which are not exactly round.

The reliability of the diameter measuring operation can be enhanced still further by ensuring that the conveyor 17 and/or the rolling unit 13 applies to successive articles 19 (i.e., to articles in successive flutes 18) torque of varying magnitude. This can be readily achieved by varying the force with which successive articles 19 are biased against the rolling surface 25 and/or by varying the force while an article 19 rolls along the surface 25. Thus, if one does not desire to rely exclusively on the cushions of pressurized gaseous fluid in the flutes 18 advancing along the path portion U2 as the only means for ensuring random orientation of seams on the wrappers of articles 19 which are about to be tested by the detector 14, it is possible to even more reliably ensure such random orientation of the seams, for example, by the expedient of moving the conveyor 17 toward and away from the rolling element 26 and/or vice versa.

FIG. 2 shows a device 68 which is designed to reciprocate the rolling element 26 at a preferably variable frequency in directions which are indicated by a double-headed arrow 67. For example, the device 68 can include an eccentric which is rotated by a suitable motor and abuts the upper end of a rod-shaped support 65 for the rolling element 26, and one or more springs which bias the upper end of the support 65 against the eccentric so that the rolling element 26 is compelled to move up and down at a selected frequency when the motor is on.

It has been found that the amplitude of reciprocatory movements of the rolling element 26 can be very small. Such amplitude is evidently less than that which would enable the articles 19 to escape from their respective flutes 18 in the uppermost position of the rolling element 26. Reciprocatory movements of relatively small amplitude are desirable on the additional ground that the rolling element 26 is then less likely to squash the articles 19 in conjunction with the surfaces bounding the flutes 18 in the path portion U2. As a rule, the extent of reciprocatory movement of the rolling element 26 in directions which are indicated by the arrow 67 will be selected in such a way that the articles 19 are deformed (if at all) only within the elastic limit of their fillers. The fillers normally consist of filamentary filter material with the filaments bonded to each other by triacetin or another suitable plasticizer to form a maze of passages for the flow of tobacco smoke.

It is equally possible to vary the torque which is applied to the articles 19 in the path portion U2 by varying the pressure of gaseous fluid in the plenum chamber 24a in pulsating fashion. This expedient can be resorted to in addition to or instead of the reciprocating device 68 for the rolling element 26. In either event, the likelihood that the seams of wrappers on the articles 19 approaching the detector 14 would assume identical or similar angular positions is practically nil. As pointed out above, this greatly enhances the likelihood of immediate detection of at least some of a series of articles 19 which are flattened or otherwise deformed to an extent which warrants detection and the undertaking of corrective measures.

Another important advantage of the rolling unit 13 is that it can cooperate with the device 68 and with the conveyor 17 to eliminate minor deformities of the articles 19. Thus, an article 19 which is slightly out of round is likely to reassume a circular cross-sectional outline as a result of rolling along the concave surface 25 of the rolling element 26.

The portion U3 of the path for the articles 19 ends at or close to the locus of transfer of articles 19 onto the next-following conveyor, e.g., onto the conveyor 8 or into the passage between the conveyors 3a and 3b, depending upon whether the conveyor 17 of FIG. 2 replaces the conveyor 7 or 9 in the machine 1 of FIG. 1.

Figure 3:
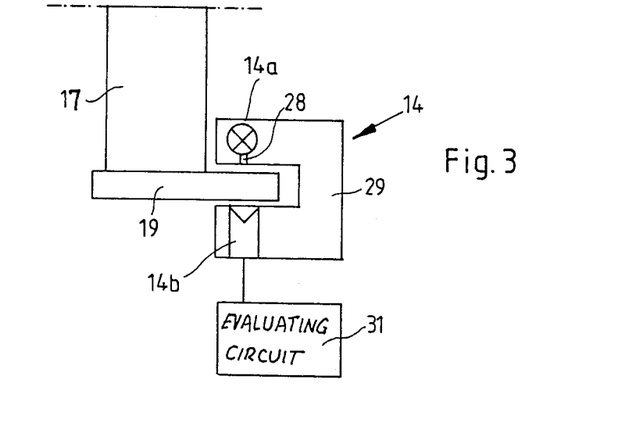
FIG. 3 is a schematic view of a carrier for a photoelectronic detector which can be utilized in the apparatus of FIG. 1.

FIG. 3 shows one presently preferred mode of installing a detector 14 adjacent the path of movement of articles 19 with a conveyor 17. As shown, one end portion of each article 19 extends beyond the respective axial end of the conveyor 17 so that successive articles can advance through the gap between the legs of a U-shaped or yoke-like carrier 29. One leg of the carrier 29 supports the radiation source 14a and the other leg supports the transducer 14b. The slot 28 which ensures that a narrow beam of radiation propagates itself across the gap between the two legs is provided in the one leg of the carrier 29. The output of the transducer 14b is connected to the input of an evaluating circuit 31, e.g., a circuit of the type shown in FIG. 4. The signals at the output of the transducer 14b are indicative of the length of intervals which elapse while the beam of radiation between the source 14a and the transducer 14b is interrupted by successive articles 19.

Figure 4:
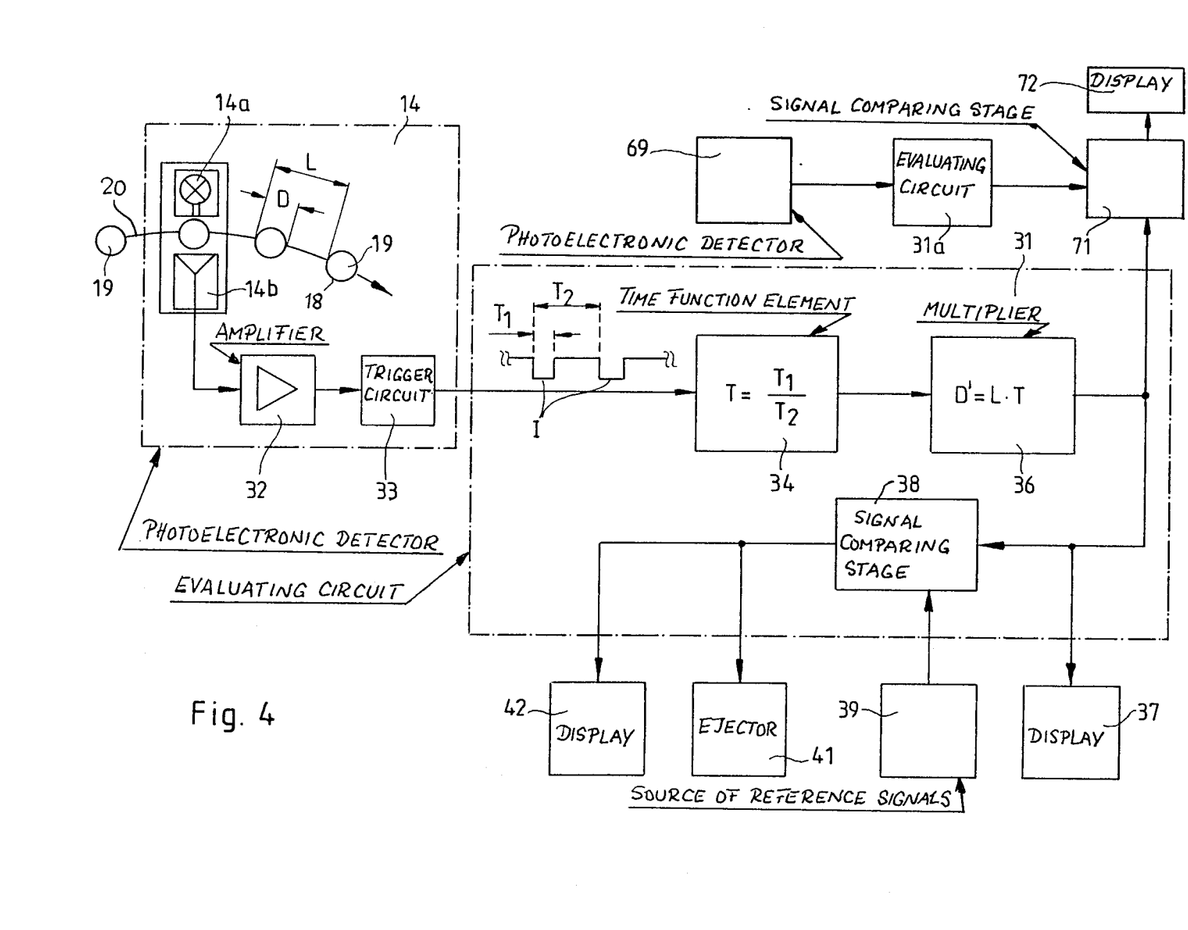
FIG. 4 is a block diagram of an evaluating circuit which can be utilized in or with the improved apparatus.

The manner in which the evaluating circuit 31 can be connected with the output of the transducer 14b is shown in FIG. 4. The signal at the output of the transducer 14b is amplified by an amplifier 32 (e.g., a logarithmic amplifier of any known design) and is thereupon modulated by a trigger circuit 33 which transmits a series of rectangular pulses I.

The character L denotes the distance between the centers or any other selected portions of flutes 18 in the peripheral surface 20 of the conveyor 17, and the character D denotes the diameter of an article 19. The distance L also denotes the mutual spacing of the axes of articles 19 in neighboring flutes 18. In order to ascertain the diameter D, it is necessary to relate the interval of interruption of the radiation beam by an article 19 to the distance L. The length of the interval of interruption of the beam by an article 19 equals $T_1$, i.e., the duration of a pulse I equals $T_1$. The duration of an interval which elapses during transport of articles 19 through a distance L equals $T_2$.

The rectangular pulses I are transmitted (at intervals $T_2$ minus $T_1$) to a time function element 34 of the evaluating circuit 31. The element 34 ascertains the values of $T_1$ and $T_2$ and generates signals T each of which equals $T_2/T_1$. Signals T are transmitted to a multiplier 36 which generates signals D' denoting the diameters D by multiplying successive signals T with the value of L. The value of L can be ascertained on the basis of the equation $L = 2R/N$ wherein R is the radius of the conveyor 17 and N is the number of flutes 18 in the peripheral surface 20 of the conveyor.

The output of the multiplier 36 is connected with a display 37 which exhibits signals denoting the diameters of successively tested individual articles 19 or groups of successive articles. Furthermore, the output of the multiplier 36 can be connected with one input of a signal comparing stage 38 having a second input connected with a source 39 of reference signals denoting the desired or ideal diameters of the articles 19. The output of the stage 38 transmits signals which are indicative of deviations of actual diameters D from desired or ideal values. Such signals can be transmitted to an ejector 41, e.g., an ejector having a valve which opens in response to transmission of a defect signal from the stage 38 to initiate expulsion of defective articles 19 from their path by blasts of compressed air or another gaseous fluid. The ejector 41 can be placed next to the conveyor 9 downstream of the detector 14 in the machine 1 of FIG. 1 or next to the conveyor 8 if the conveyor 7 of FIG. 1 is replaced with the conveyor 17 of FIG. 2. Instead of or in addition to the ejector 41, the output of the stage 38 can be connected with a display 42 which exhibits the defect signals and enables the attendants to decide that corrective steps in the machine 1 and/or 2 are necessary.

The evaluating circuit 31 of FIG. 4 is shown in the form of a block diagram for convenience of explanation and understanding. In a modern machine or production line, the evaluating circuit is normally in the form of an integrated circuit which does not or need not employ discrete modules of the type shown at 34, 36 and 38 even though it is capable of performing all functions of the aforedescribed circuit 31 with the same result.

Figure 5:
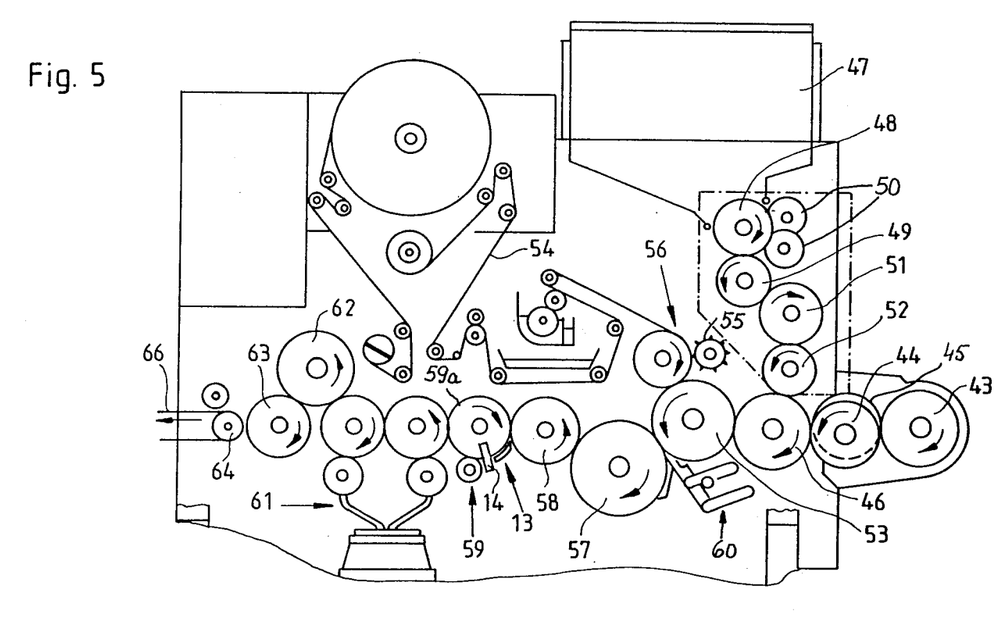
FIG. 5 is a fragmentary front elevational view of a filter tipping machine which embodies the improved apparatus.

FIG. 5 shows a portion of a filter tipping machine, for example, a machine known as MAX which is produced and distributed by the assignee of the present application. This machine is coupled with a standard cigarette maker, for example, that known as PROTOS which is produced and distributed by the assignee of the present application. The cigarette maker turns out a file of coaxial plain cigarettes of unit length or multiple unit length (it is assumed here that the maker turns out plain cigarettes of unit length), and successive plain cigarettes are propelled into successive axially parallel flutes at the periphery of a rotary drum-shaped conveyor 43 whereon evenly numbered cigarettes are axially offset with reference to oddly numbered cigarettes. Successive evenly numbered cigarettes are transferred into successive axially parallel peripheral flutes of a first staggering conveyor 44, and successive oddly numbered cigarettes are delivered into successive axially parallel flutes of a second staggering conveyor 45. The conveyors 44 and 45 advance the respective cigarettes through different distances and/or at different speeds so that each cigarette on the conveyor 44 is in axial alignment with a cigarette on the conveyor 45 before such pairs of coaxial cigarettes are delivered into successive flutes of a rotary drum-shaped assembly conveyor 46. The cigarettes of each pair are spaced apart from each other a distance which equals or exceeds the length of a filter plug of double unit length.

The frame of the filter tipping machine carries a magazine 47 for a supply of filter rod section of six times unit length. The outlet of the magazine 47 admits discrete filter mouthpieces into axially parallel peripheral flutes of a rotary drum-shaped severing conveyor 48 which cooperates with two axially offset circular knives 50 to subdivide each filter mouthpiece of six times unit length into three coaxial filter mouthpieces of double unit length. The conveyor 48 delivers filter mouthpieces of double unit length onto three discrete rotors of a composite staggering conveyor 49 whereon the filter mouthpieces (hereinafter called plugs for short) are staggered in the circumferential direction of the conveyor 49 prior to being delivered into successive flutes of a rotary drum-shaped shuffling conveyor 51. The latter cooperates with stationary cams or with other suitable means for moving some or all of the plugs axially and to thus form a row of parallel plugs wherein each preceding plug is in exact alignment with the plug behind it. Successive plugs of the thus obtained row are admitted into successive axially parallel peripheral flutes of a rotary drum-shaped combined accelerating and inserting conveyor 52 which delivers successive plugs into the spaces between pairs of aligned plain cigarettes in successive flutes of the assembly conveyor 46 so that each flute of the conveyor 46 contains a group consisting of three coaxial articles including two plain cigarettes of unit length and a filter plug of double unit length between them. The groups are thereupon condensed by moving one or both plain cigarettes axially toward the plug so that the inner end faces of the cigarettes abut the respective end faces of the plug. Such condensing can be carried out by causing successive groups to move through the gap between two convergent cam faces.

The conveyor 46 delivers successive groups of coaxial articles into successive flutes at the periphery of a rotary drum-shaped transfer conveyor 53 which further cooperates with a suction drum 56 serving as a means for applying to each group an adhesive-coated uniting band of tipping paper. The drum 56 cooperates with a rotary knife 55 which repeatedly severs the leader of a web 54 of tipping paper. The web 54 is drawn off a reel and one of its sides is coated with adhesive during travel along a paster in a manner which is well known from the art and need not be described here. Reference may be had, for example, to commonly owned U.S. Pat. No. 4,240,448 to Heitmann et al. which fully describes a filter tipping machine.

The uniting bands are applied to successive groups of coaxial articles in such a way that they extend along the respective plugs and along the inner end portions of the respective plain cigarettes. Such groups, each of which carries an adhesive-coated uniting band, are then transferred onto a rotary drum shaped rolling conveyor 57 which cooperates with a fixedly mounted or adjustable rolling member 60 to convolute the uniting bands around the respective groups so that each uniting band is converted into a tube which sealingly surrounds the respective plug as well as the adjacent inner end portions of the respective plain cigarettes. This results in the making of filter cigarettes of double unit length.

Successive filter cigarettes of double unit length are transferred into successive axially parallel peripheral flutes of a rotary drum-shaped heated drying conveyor 58 which promotes the setting of adhesive on the convoluted uniting bands and delivers successive filter cigarettes of double unit length into the axially parallel peripheral flutes of a rotary drum-shaped severing conveyor 59a which cooperates with a circular knife 59 to sever each convoluted uniting band and the respective plug midway between its ends and to thus convert each filter cigarette of double unit length into a pair of coaxial filter cigarettes of unit length.

The conveyor 59a delivers the two rows of filter cigarettes of unit length to a first conveyor of a turnaround device 61, for example, a device of the type disclosed in commonly owned U.S. Pat. No. 3,583,546 to Koop. The turn-around device 61 inverts the filter cigarettes of one row end-for-end so that the filter plugs of both rows of filter cigarettes face in the same direction, and the device 61 also places the inverted cigarettes between the non-inverted cigarettes so that the cigarettes which leave the device 61 form a single row of aligned cigarettes with all of the filter plugs facing in the same direction.

Successive filter cigarettes of the resulting single row are delivered into successive axially parallel peripheral flutes of a rotary drum-shaped testing conveyor 62 whereon the articles are tested for the presence or absence of one or more defects, e.g., holes in the wrapper, leaks between the convoluted uniting bands and the rod-shaped components, open seams, frayed ends, smudges on the wrappers and/or others. The testing conveyor 62 delivers successive tested filter cigarettes of unit length into the axially parallel peripheral flutes of a second testing conveyor 63 which is provided or cooperates with means for testing the density of the tobacco-containing ends of filter cigarettes and is further provided or cooperates with means (such as the ejector 41 of FIG. 4) for expelling defective cigarettes so that the upper reach of an endless belt conveyor 66 receives only those filter cigarettes which are acceptable for introduction into a packing machine. The conveyor 66 is trained over pulleys 64 (only one shown in FIG. 5).

A rolling unit 13 and a photoelectronic detector 14 are installed next to the severing conveyor 59a to perform the functions of the similarly referenced parts in the apparatus of FIG. 2. Thus, the diameter of each filter cigarette of double unit length is monitored ahead of the locus where such cigarettes are severed by the knife 59 to yield pairs of filter cigarettes of unit length.

FIGS. 1, 3, 4 and 5 show apparatus each of which operates with a single photoelectronic detector 14. Of course, the reliability of measurements can be enhanced still further if each rod-shaped article is tested with two or more detectors. This is shown in FIG. 2 wherein a second photoelectronic detector 69 including a radiation source and a transducer is installed upstream of the rolling unit 13 and serves to ascertain the diameters of successive articles 19 prior to entry of such articles into the path portion U2. The beam of radiation which is furnished by the radiation source of the detector 69 is inclined with reference to the beam of radiation issuing from the radiation source 14a and being directed toward the transducer 14b.

The detector 69 or another suitable detector can be installed downstream of the detector 14 or between the detector 14 and the rolling unit 13.

FIG. 4 shows certain additional modules which are combined with or embodied in the evaluating circuit 31 if the apparatus of the present invention comprises several detectors. The output of the multiplier 36 is connected with the input of a signal comparing stage 71 which further receives signals from a source 31a of reference signals, namely a second evaluating circuit which can be identical with the circuit 31 and processes signals from the transducer of the second detector 69. The stage 71 compares signals D' (denoting the ascertained diameters of articles 19 which have advanced past the rolling element 26) with signals denoting the diameters of articles 19 as determined ahead of the rolling unit 13. The output of the stage 71 furnishes signals which are indicative of the differences between the signals from the evaluating circuits 31 and 31a, and such signals can be transmitted to a display 72 and/or to an ejector corresponding to the ejector 41.

The improved method and apparatus can be modified in a number of additional ways without departing from the spirit of the invention. For example, the stationary rolling element 26 of the apparatus which is shown in FIG. 2 can be replaced with or can support an endless band or a set of rollers which define an equivalent of the rolling surface 25 and are contacted by articles 19 advancing along the path portion U2. All that counts is to ensure that the speed of the rolling surface 25 or an equivalent rolling surface departs from the speed of movement of articles 19 along the path portion U2. This ensures that the articles 19 are compelled to turn about their respective axes ahead of the detector 14. The speed of the surface 25 on the rolling element 26 of FIG. 2 is zero. The aforementioned endless band on the rolling element 26 (if such band is used to define the rolling surface) can be driven to advance its article-contacting reach in or counter to the direction which is indicated by the arrow 17a. It is also possible to move the conveyor 17 relative to a stationary (non-reciprocable) rolling element or to use a reciprocable conveyor, a reciprocable rolling element 26 and means for pulsating the pressure of gaseous fluid in the plenum chamber 24a. The utilization of a conveyor which is reciprocable is the least desirable expedient for varying the magnitude of torque which is transmitted to articles 19 during travel along the path portion U2.

An important advantage of the improved method and apparatus is that the diameters of rod-shaped articles can be ascertained with a very high degree of reliability even if the apparatus employs a single optical detector. This is due to the fact that the articles are rotated about their respective axes ahead of the single detector or ahead of at least one of two or more detectors. Such rotation ensures that the orientation of articles (namely the orientation of the seams on the wrappers of the articles if the articles are rod-shaped articles of the tobacco processing industry) can or does change from article to article so that the detector or detectors are much more likely to detect at least some of the articles which are not round. Of course, the reliability of the improved method and apparatus is enhanced still further if the articles of a series of successively tested articles are turned at random through different angles.

The results of tests of articles in the improved apparatus with a single detector are much more reliable than the results of tests of articles in conventional apparatus which employ two or more detectors operating with beams which are inclined relative to each other, namely in apparatus which are not provided with means for changing the angular positions of some or all of the articles ahead of at least one detector.

Another important advantage of the improved apparatus is its simplicity. All that is necessary is to provide a simple article rolling unit ahead of one or more detectors and preferably some means for invariably ensuring that articles will be turned at random through different angles.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of rotating rod-shaped articles about their respective axes, comprising the steps of introducing the articles into the flutes of a fluted conveyor so that the articles contact the surfaces surrounding the respective flutes and advancing the articles in a predetermined direction along a predetermined path; positioning a rolling surface adjacent a portion of said path; and pneumatically moving the articles relative to the conveyor into contact with the rolling surface while the articles continue to move in said direction, said moving step including admitting a compressed gas into the flutes in a direction to expel the articles from the respective flutes and said positioning step including placing the rolling surface sufficiently close to the conveyor to prevent complete expulsion of articles from their respective flutes.

2. Apparatus for rotating rod-shaped articles about their respective axes, comprising a conveyor having article-receiving flutes and arranged to advance the articles in a predetermined direction along a predetermined path; a rolling device adjacent a portion of said path; and means for pneumatically moving the articles in their respective flutes into contact with said device, said moving means including ports provided in said conveyor and communicating with said flutes, a source of pressurized fluid, and means for connecting said source with the ports in said portion of said path.

3. The apparatus of claim 2, wherein said device has a rolling surface extending in said direction along said portion of said path, each of said flutes having a deepmost portion and the distance of deepmost portions of flutes in said portion of said path from said rolling surface being greater than the diameter of a rod-shaped article.

4. A method of rotating rod-shaped articles about their respective axes, comprising the steps of maintaining the articles in contact with a conveyor and advancing the articles in a predetermined direction along a predetermined path; positioning a rolling surface adjacent a portion of said path; pneumatically moving the articles relative to the conveyor into contact with the rolling surface while the articles continue to move in said direction; and maintaining the articles in contact with the rolling surface with a varying force to thus vary the magnitude of torque which the rolling surface transmits to the articles.

5. The method of claim 4, wherein said moving step includes reducing the extent of contact between the articles and the conveyor.

6. The method of claim 4, wherein said maintaining step includes introducing the articles into the flutes of a fluted conveyor so that the articles contact the surfaces surrounding the respective flutes, said moving step including admitting a compressed gas into the flutes in a direction to expel the articles from the respective flutes, said positioning step including placing the rolling surface sufficiently close to the conveyor to prevent complete expulsion of articles from their respective flutes.

7. Apparatus for rotating rod-shaped articles about their respective axes, comprising a conveyor having article-receiving flutes and arranged to advance the articles in a predetermined direction along a predetermined path; a rolling device adjacent a portion of said path and including means for applying to the articles torque of varying magnitude; and means for pneumatically moving the articles in their respective flutes into contact with said device.

8. The apparatus of claim 7, wherein said moving means includes ports provided in said conveyor and communicating with said flutes, a source of pressurized fluid, and means for connecting said source with the ports in said portion of said path.

* * * * *